US006199804B1

United States Patent
Donofrio, Jr.

(10) Patent No.: US 6,199,804 B1
(45) Date of Patent: Mar. 13, 2001

(54) DISPLAY DEVICE FOR SPORTS MEMORABLILIA

(76) Inventor: Nicholas Donofrio, Jr., 3 Wildflower Dr., Oxford, CT (US) 06478

( * ) Notice: Subject to any disclaimer, the term of this patent is extended or adjusted under 35 U.S.C. 154(b) by 0 days.

(21) Appl. No.: 09/248,702

(22) Filed: Feb. 11, 1999

Related U.S. Application Data

(60) Provisional application No. 60/095,651, filed on Aug. 7, 1998.

(51) Int. Cl.[7] .................................................... F16L 3/00
(52) U.S. Cl. .................. 248/121; 248/316.3; 248/230.7; 248/230.6
(58) Field of Search ................................ 248/121, 122.1, 248/128, 127, 316.1, 176.1, 175, 309.1, 316.3, 316.8, 230.6, 231.71, 230.7, 231.81, 205.5, 205.7, 206.1, 206.3, 683; 206/315.9, 232, 315.1, 579, 775; 312/114; 211/14; D6/470; D21/357

(56) References Cited

U.S. PATENT DOCUMENTS

| D. 335,400 | * | 5/1993 | Reich ..................................... D6/470 |
| 339,072 | * | 3/1886 | Nies ................................ 248/231.71 |
| D. 365,948 | * | 1/1996 | Borden ................................... D6/470 |
| 2,262,873 | * | 11/1941 | Wise ...................................... 40/607 |
| 2,368,347 | * | 1/1945 | Colberg .............................. 434/131 |
| 2,572,454 | | 10/1951 | Down et al. .............................. 40/68 |
| 2,727,325 | | 12/1955 | Jurinic ......................................... 41/4 |
| 3,231,993 | * | 2/1966 | Levy ....................................... 40/493 |
| 3,508,732 | * | 4/1970 | Trachtenberg et al. .............. 248/226 |
| 3,559,935 | | 2/1971 | Gardner .............................. 248/125 |
| 3,601,451 | * | 8/1971 | Melcher ............................... 312/125 |
| 4,278,223 | * | 7/1981 | Fauteux ............................... 248/125 |
| 4,848,714 | * | 7/1989 | Ziaylek, Jr. et al. ............... 248/544 |
| 5,082,110 | | 1/1992 | Hager ................................... 206/232 |
| 5,165,538 | * | 11/1992 | Peters ................................ 206/315.9 |
| 5,377,829 | | 1/1995 | Bahl ................................. 206/315.9 |
| 5,560,579 | * | 10/1996 | Woodside .......................... 248/316.8 |
| 5,695,056 | * | 12/1997 | Bender et al. .................... 206/315.9 |
| 5,735,075 | * | 4/1998 | Honkawa et al. .................. 47/41.12 |
| 5,826,837 | * | 10/1998 | Moineau et al. ....................... 248/97 |
| 5,868,249 | * | 2/1999 | Ehnert .............................. 206/315.9 |
| 5,881,885 | * | 3/1999 | Grimm ................................ 206/779 |
| 5,893,553 | * | 4/1999 | Pinkous ............................... 269/249 |
| 6,016,910 | * | 1/2000 | Rodearmel ........................ 206/315.9 |
| 6,029,826 | * | 2/2000 | Clay ....................................... 211/14 |

\* cited by examiner

Primary Examiner—Anita M. King
Assistant Examiner—N. Sanders
(74) Attorney, Agent, or Firm—Cummings & Lockwood

(57) ABSTRACT

A display device including a base, first and second arms extending from the base, first and second retainers attached respectively to the first and the second arms, and wherein one of the arms and the retainers are flexible such that the retainers can be spread apart to receive a ball and then released to hold the ball therebetween. The display device also includes sports memorabilia held between the first and the second retainers.

20 Claims, 6 Drawing Sheets

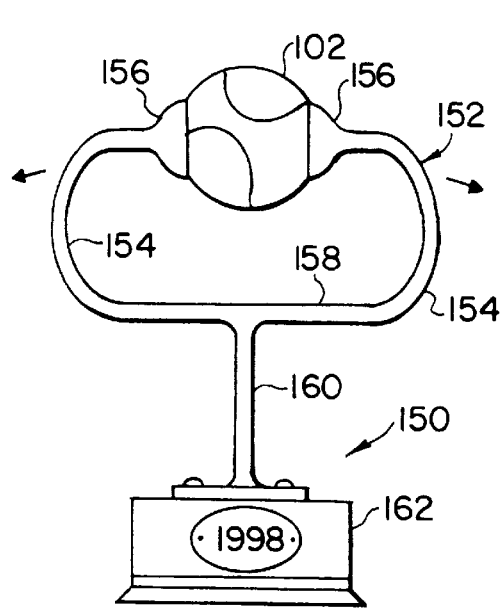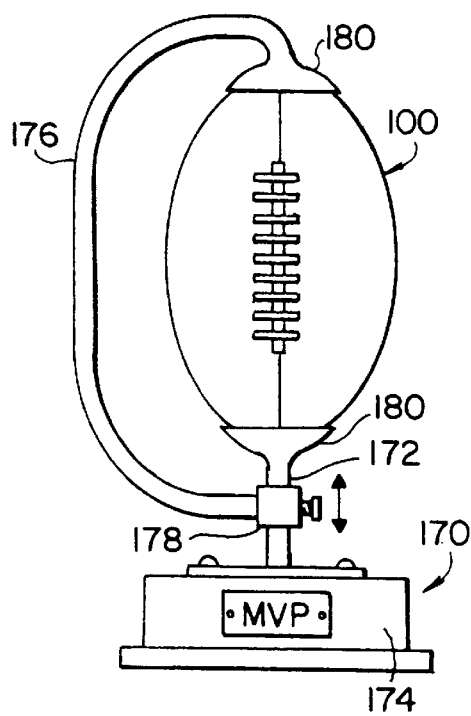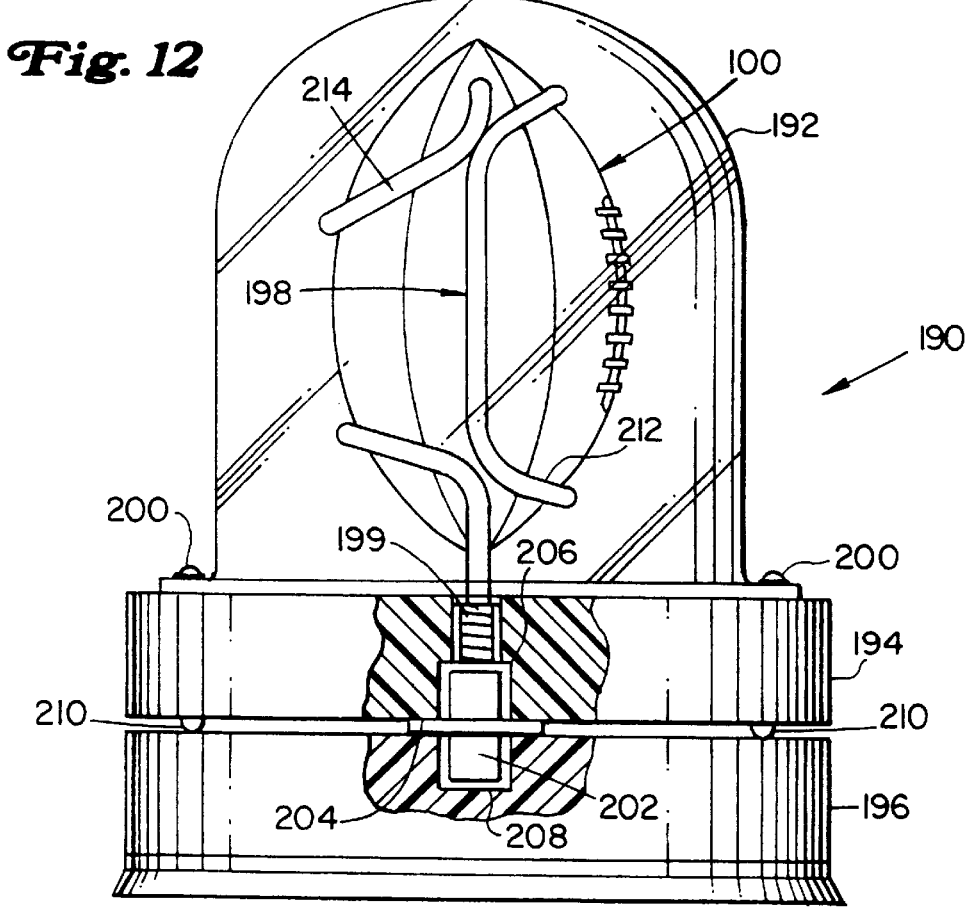

DISPLAY DEVICE FOR SPORTS MEMORABLILIA

RELATED APPLICATIONS

This application claims priority to U.S. provisional patent application Ser. No. 60/095,651 filed on Aug. 7, 1998, the disclosures of which is herein incorporated by reference in its entirety.

FIELD OF DISCLOSURE

The present disclosure relates to a display device, and, more particularly, relates to a display device for displaying sports memorabilia, such as, for example, a ball or a helmet.

Often it is desirable to display a ball or a helmet, or other sport memorabilia as a trophy, such as when the memorabilia has been signed by a famous professional athlete, or when the memorabilia has been awarded to a player for his or her performance in a game, or when the memorabilia bears a team's indicia and is displayed to show loyalty to that team.

Preferably a display device for sports memorabilia will present and display the memorabilia, whether it be a football, baseball, basketball or helmet, for example, in an attractive fashion. It is also preferably that a display device for sports memorabilia be designed to allow a person to touch and turn the memorabilia such that all sides of the ball can be viewed. Furthermore, it is preferably that a display device for sports memorabilia be adapted for hanging on a wall, and be simple and economical in design, and easily accept sports memorabilia, such as a ball, yet securely hold the ball on display.

SUMMARY OF DISCLOSURE

Accordingly, the present disclosure provides a display device including a plaque, first and second arms extending from the plaque, and first and second retainers attached respectively to the first and the second arms. Wherein one of the arms and the retainers are flexible such that the retainers can be spread apart to receive a ball and then released to hold the ball therebetween. The display device also includes sports memorabilia such as a ball or a helmet held between the first and the second retainers.

According to one aspect of the present disclosure, the arms are flexible.

According to another aspect of the present disclosure, the retainers are flexible.

According to an additional aspect of the present disclosure, the retainers comprise flexible cups.

According to a further aspect of the present disclosure, the retainers comprise rigid cups.

According to still another aspect of the present disclosure, the cups are made of a low friction material.

According to an additional aspect of the present disclosure, the display device further comprises low friction liners positioned within the cups.

According to a further aspect of the present disclosure, the cups are rotatably secured to the arms.

According to another aspect of the present disclosure, the retainers each comprise a rigid ring.

According to yet an additional aspect of the present disclosure, the retainers each comprise a prong.

According to a further aspect of the present disclosure, the display device further comprises an arm assembly including the first and the second arms, wherein the arm assembly is rotatably secured to the plaque.

According to another aspect of the present disclosure, the arms are secured to a base rotatably mounted to the plaque.

According to an additional aspect of the present disclosure, the plaque is adapted to be hung on a vertical surface, such as a wall.

Still other features and advantages will become apparent upon reading the following detailed description in conjunction with the drawings and the appended claims.

BRIEF DESCRIPTION OF DRAWINGS

FIG. 9 is a front elevation view of an additional display device according to the present disclosure shown holding a ball;

FIG. 10 is a front elevation view of a further display device according to the present disclosure shown holding a ball;

FIG. 11 is a front elevation view of a still another display device according to the present disclosure shown holding a ball;

FIG. 12 is a front elevation view of a still an additional display device according to the present disclosure shown holding a ball;

DETAILED DESCRIPTION OF DISCLOSURE

Figure 1:
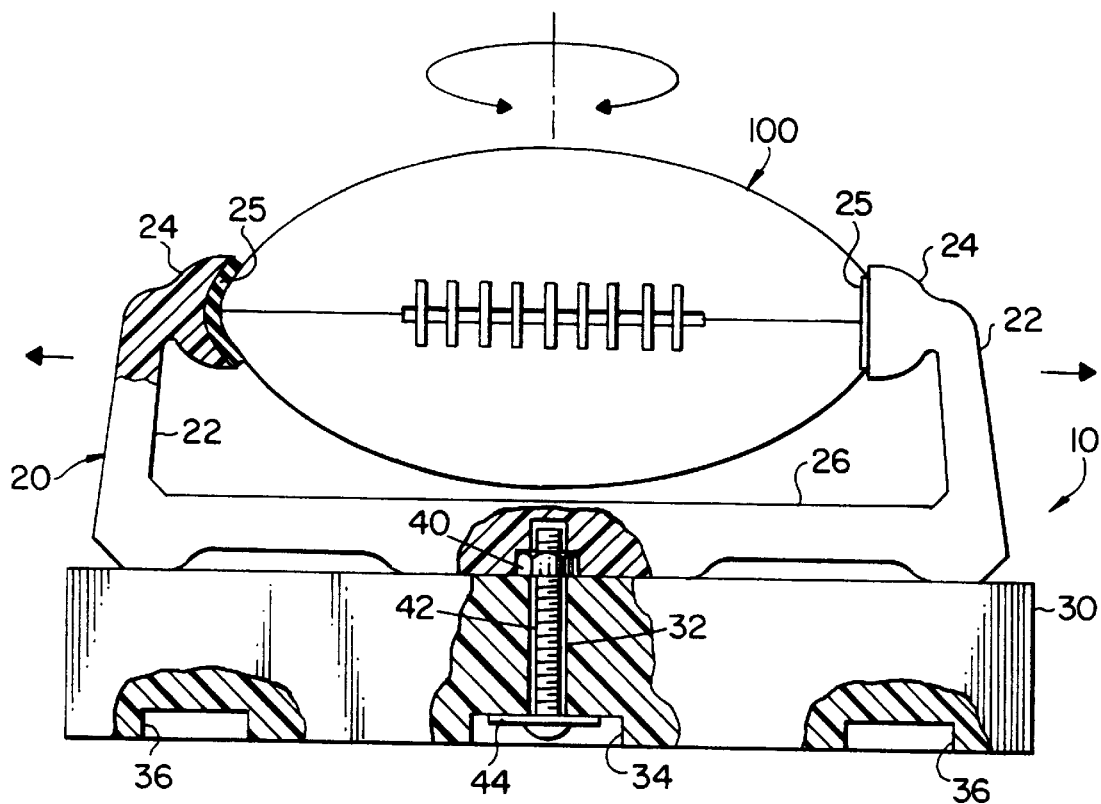
FIG. 1 is a front elevation view, partially in section, of a display device according to the present disclosure shown holding a ball.

Referring first to FIG. 1, a display device 10 for displaying sports memorabilia, such as a football 100, is provided. It may be desirable to display a ball for a number of reasons.

For example, the ball could be autographed by a famous athlete or athletes, or earned by an individual as a most valuable player, i.e., a "game ball", or a championship ball earned by a team.

The display device 10 includes an arm assembly 20 mounted to a plaque 30. Preferably, the arm assembly 20, which holds the ball 100, is rotatably mounted to the plaque 30 such that the arm assembly and the ball can be rotated with respect to the plaque for inspection of the ball. The arm assembly 20 includes first and second arms 22 connected by a shoulder 26. Each arm 22 includes a retainer in the form of a cup 24 for holding the ball 100. Each cup includes a liner 25 made of a low friction material such as felt or Teflon, for example, such that the ball can be rotated with respect to the stationary cups.

The arm assembly 20 is preferably unitarily formed as a single piece and is preferably made of a resilient, flexible material, such as for example, plastic or metal, or another appropriate material, for example. Thus, in order to securely position the ball 100 within the arm assembly 20, the first and second arms 22 are simply spread apart to receive the ball, and then released such that the resilient arms 22 grip and hold the ball in place. Although not shown, the arm assembly 20 can also be provided with a centrally located, third arm for providing additional support for the ball 100 between the first and second arms 22.

In the particular embodiment shown, the arm assembly 20 is rotatably mounted to the plaque 30 using a nut 40 and a bolt 42. The plaque 30 has a centrally located bore 32 extending from a recess 34 in the bottom of the plaque. The bolt 42 extends through a washer 44 and the bore 32 and is threadingly received by the nut 40, which is preferably molded in the shoulder 26 of the arm assembly 20. The plaque 30 also includes spaced-apart recesses 36 on its bottom surface such that the display device 10 can preferably be mounted or hung on a vertical surface, such as a wall. However, the display device 10 could simply be placed on a horizontal surface, such as a table.

Figure 2:
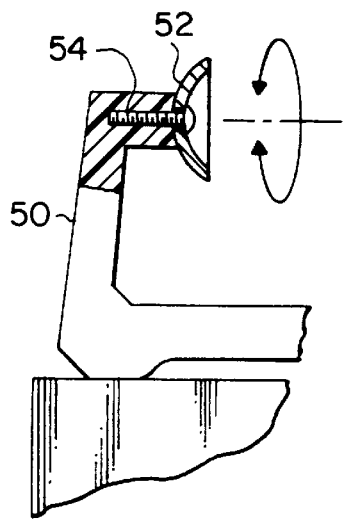
FIG. 2 is a front elevation view of an alternative arm for the display device of FIG. 1.

Referring now to FIG. 2, the display device can alternatively be provided with arms 50 having a cup 52 that rotates with respect to the arm such that the ball can be rotated, for viewing, or examination. The cup 52 is secured to the arm 50 with a screw 54, which extends through the cup and is threadingly received by the arm. Since the cup 52 itself rotates, a low friction liner is not necessary but may be provided to prevent scratches on the ball.

Figure 3:
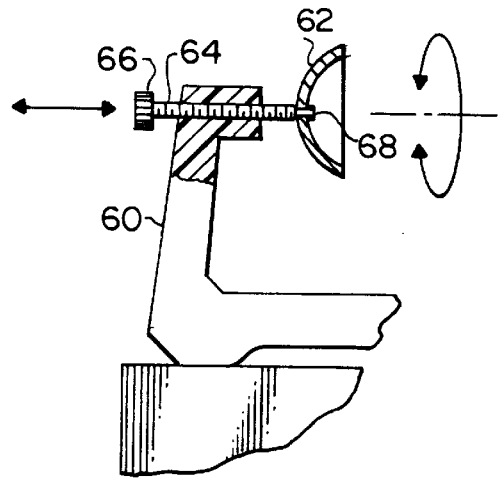
FIG. 3 is a front elevation view of an alternative arm for the display device of FIG. 1.

Referring to FIG. 3, the display device can alternatively be provided with arms 60 having a screw-adjustable cup 62. A bolt 64 extends through and is threadingly received by the arm 60, and a knob 66 and the cup are secured to opposite ends of the bolt. Preferably the cup 62 is secured to the bolt 64 with a rivet 68 such that the cup rotates with respect to the bolt. The arm 60 may or may not be resilient, since it is not required to be spread apart to receive the ball. The ball is simply clamped by the screw-adjustable retainer cup 62.

Figure 4:
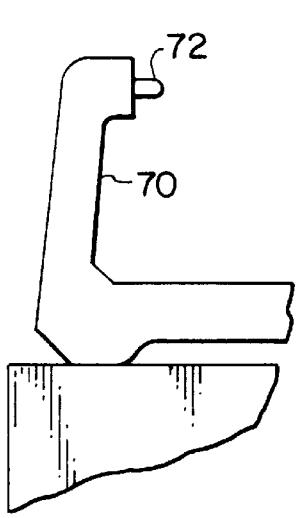
FIG. 4 is a front elevation view of an alternative arm for the display device of FIG. 1.

Referring to FIG. 4, in place of the cup, an arm 70 can be provided with a prong 72 which is received within the tip of the football such that the football is retained by the prong, yet can be axially rotated. The prong 72 is preferably unitarily formed with the arm 70.

Figure 4A:
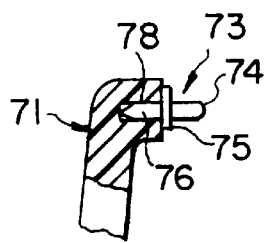
FIG. 4a is a front elevation view of an alternative arm for the display device of FIG. 1.

Referring to FIG. 4a, the display device can alternatively have arms 71, wherein each arm is provided with a prong 73 having a first end 74 received within the tip of the football and a second end 76 received within a bore 78 of the arm such that the football is retained by the prong, yet both the football and the prong can be axially rotated. The prong 73 also includes a radially extending collar 75 between its first and second ends 74, 76.

Figure 5:
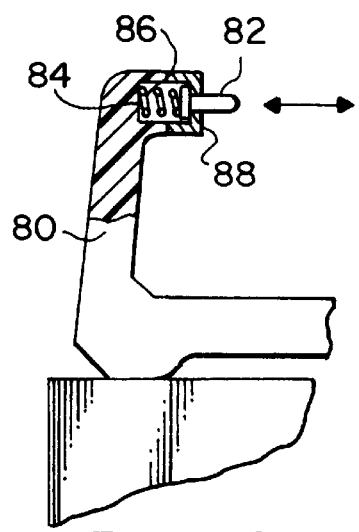
FIG. 5 is a front elevation view of an alternative arm for the display device of FIG. 1.

As shown in FIG. 5, the display device can alternatively have prongs 82 springmounted within its arms 80. Each arm 80 includes a recess 84 receiving a spring 86 and the prong 82, and a cap 88 retains the prong and the spring within the recess. The prong 82 is then simply depressed into the recess 84 to receive a ball.

Figure 6:
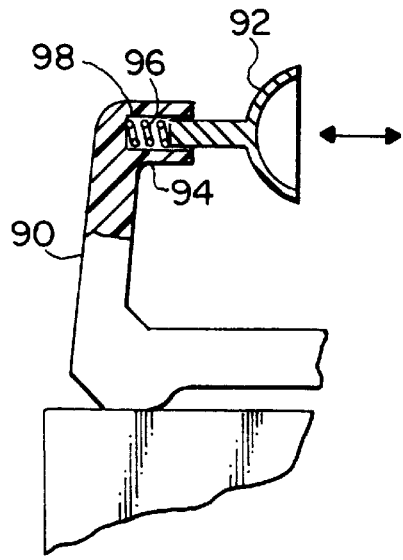
FIG. 6 is a front elevation view of an alternative arm for the display device of FIG. 1.

As shown in FIG. 6, the display device can alternatively have arms 90 provided with a spring-loaded cup 92. A hook 94 retains an end of a spring 96 within a recess 98 of the arm and the spring is secured at an opposite end to the cup 92. Thus, the cup 92 is simply depressed into the recess 98 to receive a ball.

Figure 7:
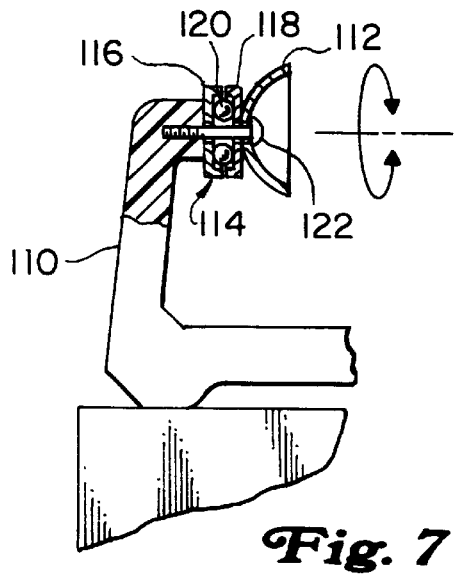
FIG. 7 is a front elevation view of an alternative arm for the display device of FIG. 1.

Referring to FIG. 7, the display device can alternatively have arms 110, wherein each arm is provided with a cup 112 mounted with a ball-bearing assembly 114, such that the cup can rotate with respect to the arm. The ball-bearing assembly 114 includes first and second facing shells 116, 118, which together retain ball-bearings 120 there between, such that the shells can smoothly rotate with respect to each other. The cup 112 is secured to, and preferably unitarily formed with, the second shell 118. A screw 122 extends through the cup 112 and the shells 116, 118 and is threadingly received in the arm 110, securing the cup and the ball-bearing assembly to the arm, such that they can both rotate with respect to the arm. The ball-bearing assembly 114 provides a smooth rotation of the cups 112 and, thus, a ball held between the cups, with little resistance.

Figure 8:
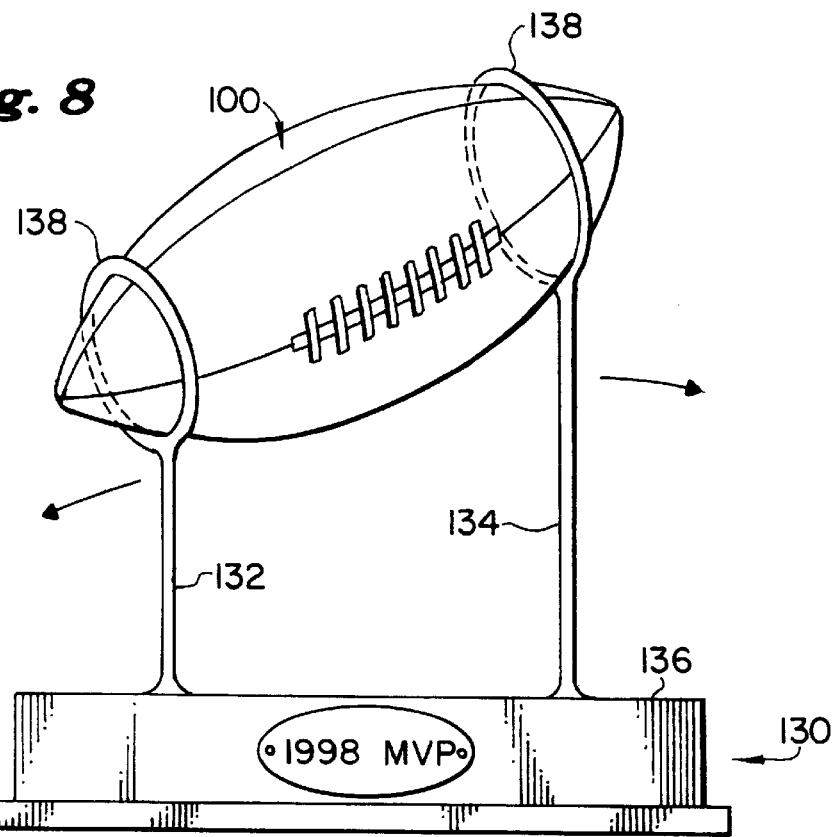
FIG. 8 is a front elevation view of an alternative arm for the display device of FIG. 1.

Referring now to FIG. 8, a display device 130 is provided that includes first and second arms 132 that are preferably unitarily formed with a plaque 136. Each arm 132 includes a ring 138 for receiving a ball, which as shown can comprise a football 100. In addition, each arm 132, 134 is made of a resilient, flexible material such that they can be spread apart to receive the ball 100.

Figure 9:
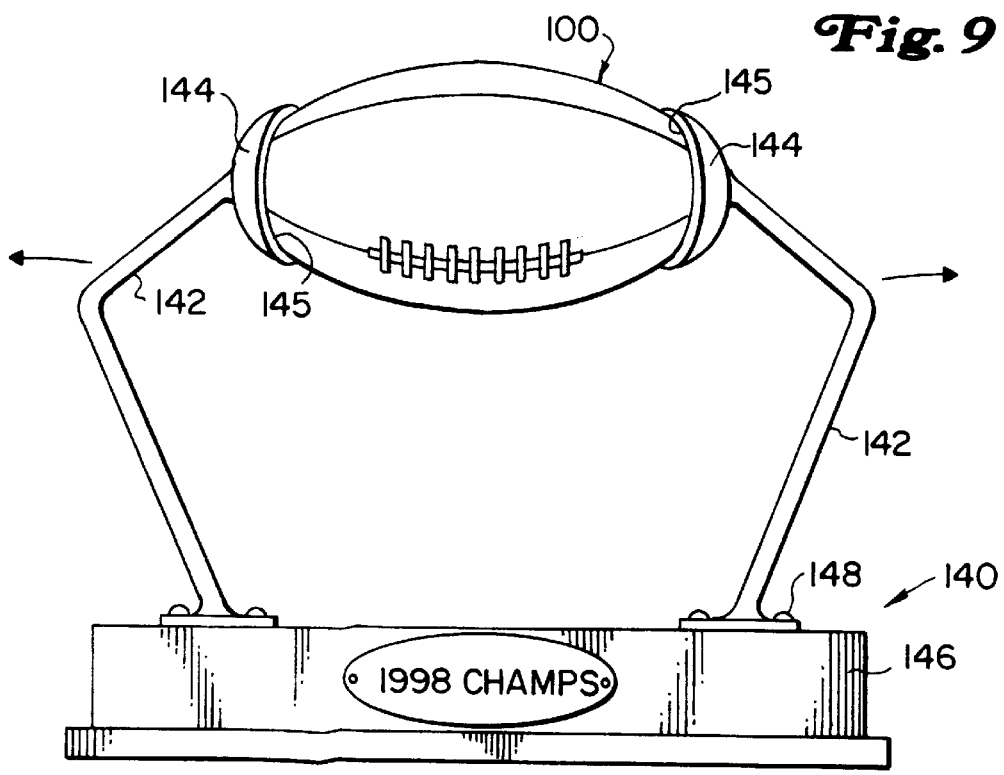
FIG. 9 is a front elevation view of another display device according to the present disclosure shown holding a ball.

Referring to FIG. 9, an additional display device 140 is shown. The display device 140 includes first and second arms 142 which are secured to a plaque 146, preferably with screws 148. Each arm 142 includes a cup 144 for receiving the ball 100 and is made of a resilient, flexible material such that they can be spread apart to receive the ball 100. A low friction liner 145 is provided in each cup 144.

In FIG. 10, another display device 150 is shown. The display device 150 includes an arm assembly 152 having first and second arms 154 connected by a shoulder 158, and a post 160 extending from the shoulder and secured to a plaque 162. Each arm 154 includes a cup 156 for retaining a ball, which as shown can comprise a baseball 102. An enlarged version can be provided for a basketball. Again, the arms 154 are made of a resilient, flexible material such that they can be spread apart to receive the ball 102.

Another display device 170 is shown in FIG. 11. The display device 170 includes a first arm 172 secured to and extending upwardly from a plaque 174. A C-shaped second arm 176 is adjustably secured to the first arm 172 with a clamp 178, such that it extends above the first arm. The arms 172, 176 each include cups 180 for holding a ball 100. In particular, the arms 172, 176 are configured to hold a football 100 in an upright position. The clamp 178 allows the second arm 176 to be moved up and down with respect to the first arm 172 such that the arms can be spread apart to receive the ball 100, then brought together to grip the ball, and then the clamp can be secured in place on the first arm to retain the ball in place. Although not shown, low friction liners are provided in the cups 180.

Referring to FIG. 12, an additional display device 190 is shown. The display device 190 includes a transparent case 192 mounted to a base 194 which is rotatably mounted to a plaque 196. An arm assembly 198 is provided in the form of a hollow tube having a threaded lower end 199 threadingly received in the base 194. The hollow tube is bent into first and second spaced-apart rings 212, 214 between which a ball 100 is secured. As shown, the ball 100 can comprise a football and the ball display device 198 and the football are contained within the case 192. The ball display device 198 is somewhat resilient such that the rings 212, 214 can be spaced-apart to receive the ball 100 and then released to hold the ball.

The transparent case 192 is secured to the base 194 using screws 200, for example. The base 194 is rotatably mounted to the plaque 196 with a cylindrical shaft 202 having a radially extending collar 204. The cylindrical shaft 202 is received within corresponding bores 206, 208 of the base 194 and the plaque 196, and the collar 204 separates the base from the plaque. The base 194 may also include feet 210 for preventing wobble between the base and the plaque. The feet 210 and the cylindrical shaft 202 are preferably made of a low friction material such as Teflon, for example. The case 192 also includes a knob 193 for turning the case, the ball 100 and the base 194 with respect to the plaque 196, such that the ball can be examined. It should be understood that while the case 192, the base 194 and the plaque 196 are shown as having a circular cross-section, they could be provided in other desirable shapes such as square or triangular, for example.

Figure 13:
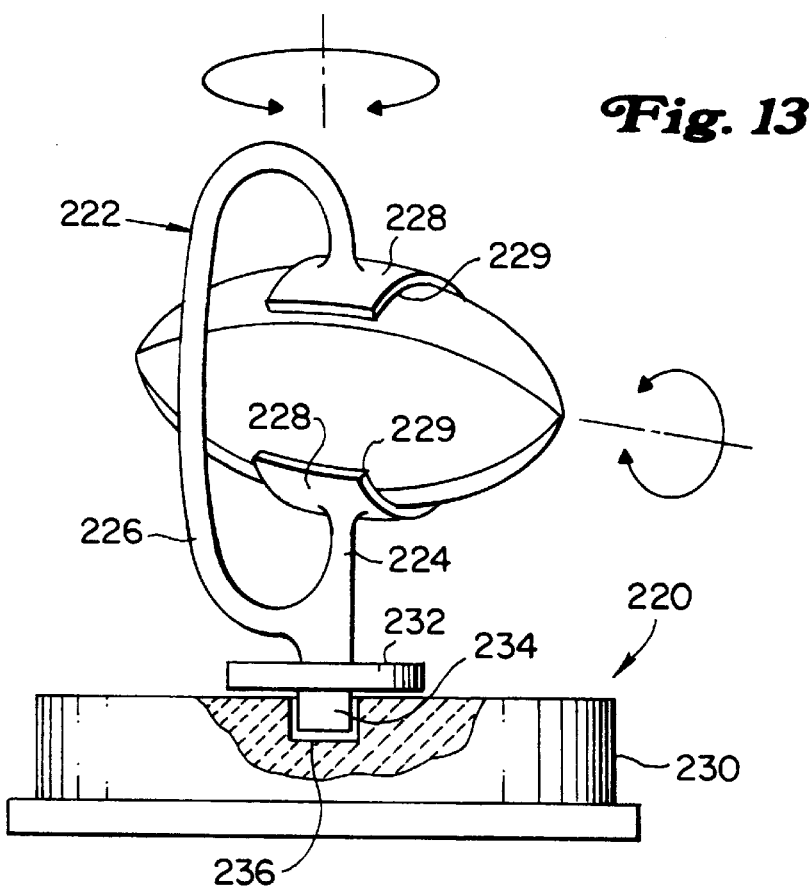
FIG. 13 is a front elevation view of a still another display device according to the present disclosure shown holding a ball.

In FIG. 13, another display device 220 is shown. The display device 220 includes an arm assembly 222 having first and second resilient, flexible arms 224, 226 arranged such that the second arm extends above the first arm to resiliently grip and hold a football 100. Each arm 224, 226 includes a cup 228 for gripping the ball 100, and a low-friction liner 229 is provided in each cup. The display device 220 also includes a plaque 230 and the arm assembly 222 includes a collar 232 for resting on the plaque and a shaft 234 rotatably received within a bore 236 of the plaque such that the arm assembly and the ball 100 may be rotated with respect to the plaque.

As shown, the plaque 230 in FIG. 13 is made of ceramic. It should be understood that all the plaques, arms and arm assemblies disclosed can be made from any suitable materials such as granite, stainless steel, silver, gold, wood or plastic, for example.

Figure 14:
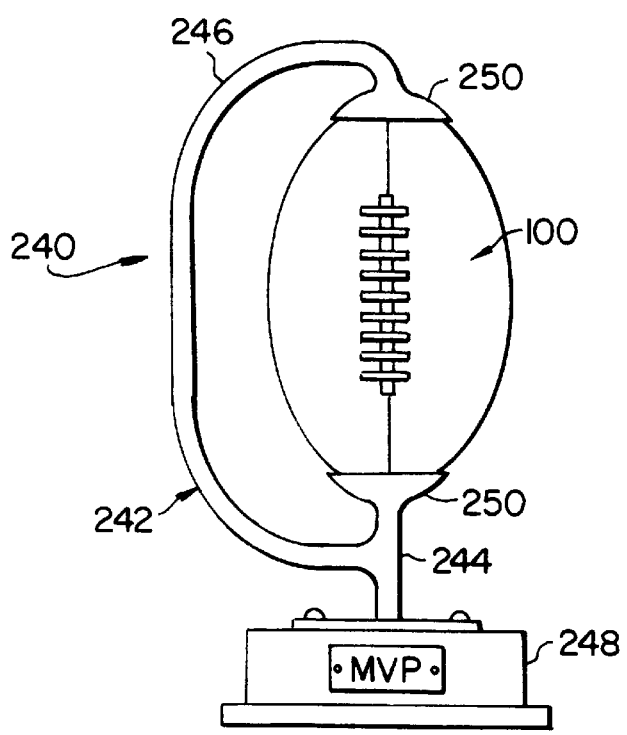
FIG. 14 is a front elevation view of still an additional display device according to the present disclosure shown holding a ball.

Another display device 240 is shown in FIG. 14. The display device 240 includes an arm assembly 242 having resilient, flexible first and second arms 244, 246. The first arm 244 is secured to and extends upwardly from a plaque 248. The C-shaped second arm 246 extends upwardly from the first arm 244. The arms 244, 246 each include cups 250 for holding a ball 100. In particular, the arms 244, 246 are configured to hold a football 100 in an upright position. The resilient arms 244, 246 can be spread apart to receive the ball 100, then released to grip and retain the ball in place. Although not shown, low friction liners are provided in the cups 250.

Figure 15:
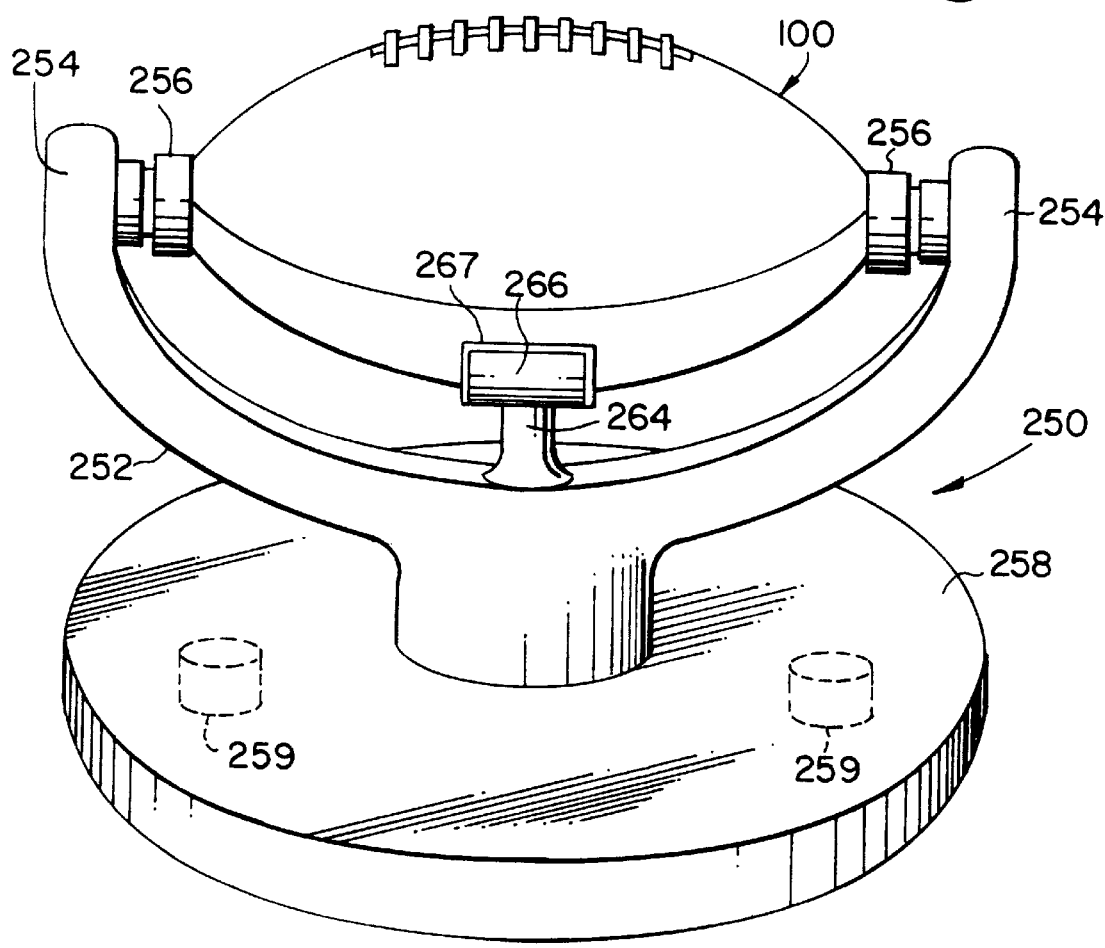
FIG. 15 is a front perspective view of a display device according to the present disclosure shown holding a ball.

In FIG. 15, another display device 250 is shown. The display device 250 includes an arm assembly 252 secured to a plaque 258, and having first and second arms 254. The plaque 258 preferably includes depressions 259 for allowing the plaque to be hung on a wall.

Figure 16:
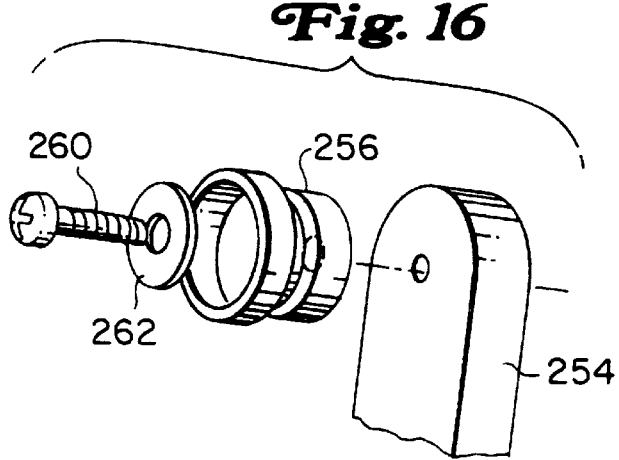
FIG. 16 is an exploded perspective view of an arm of the display device of FIG. 15.
Figure 17:
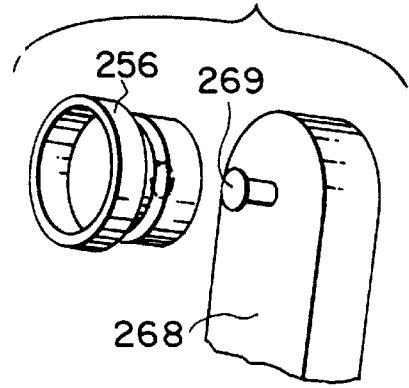
FIG. 17 is an exploded perspective view of an alternative arm for the display device of FIG. 15.

The arm assembly 252 is made of a rigid material, such as wood or metal. Each arm 254 includes an attached resilient, flexible cup 256 for retaining a ball, which as shown can comprise a football 100. The flexible cups 256 can be attached to the rigid arms 254 in many ways, such as by using a screw 260 and a washer 262, as shown in FIG. 16, or by providing arms 268 having bosses 269 for receiving the cups 256, as shown in FIG. 17. The arm assembly 252 can also be provided with a third arm 264 positioned between the first and the second arms 254 for providing additional support for the ball 100. The third arm 264 includes a cup 266 having a low-friction liner 267.

Thus, new, useful and desirable display devices for displaying sports memorabilia have been disclosed. In summary, a display device for displaying sports memorabilia as disclosed herein generally includes spaced-apart cups or rings for securing a ball or other sports memorabilia in place for display. Preferably, each display device provides means for turning the displayed ball such that all sides of the ball can be examined.

The principles, preferred embodiments and modes of operation of the present display devices have been described in the foregoing specification. The presently disclosed display devices, however, are not to be construed as limited to the particular embodiments shown as these embodiments are regarded as illustrious rather than restrictive. Moreover, variations and changes may be made by those skilled in the art without departing from the spirit of the presently disclosed display devices as set forth by the following claims.

What is claimed is:

1. A display device comprising:
   a base;
   first and second arms extending from the base;
   first and second retainers attached respectively to distal ends of the first and the second arms;
   wherein the arms are made from a resiliently flexible material such that the first and the second arms can be spread apart due to the flexibility of the arms to receive sports memorabilia between the retainers, and then the arms can be released to substantially return to their original shape due the resiliency of the arms and hold the memorabilia in compression between the retainers; and
   sports memorabilia held between the first and the second retainers.

2. The display device of claim 1 wherein the arms are made from a polymeric material.

3. The display device of claim 1 wherein the the first and second arms form a U-shaped arm assembly secured to the base of the display device.

4. The display device of claim 1 wherein the retainers comprise flexible cups.

5. The display device of claim 1 wherein the retainers comprise rigid cups.

6. The display device of claim 5 wherein the cups are made of a low friction material.

7. The display device of claim 5 further comprising low friction liners positioned within the cups.

8. The display device of claim 5 wherein the cups are rotatably secured to the arms.

9. The display device of claim 1 wherein the retainers each comprise a rigid ring.

10. The display device of claim 1 wherein the retainers each comprise a prong.

11. The display device of claim 1 further comprising an arm assembly including the first and the second arms, wherein the arm assembly is rotatably secured to the base.

12. The display device of claim 1 wherein the arms are secured to a support rotatably mounted to the base.

13. The display device of claim 1 wherein the base is adapted to be hung on a wall.

14. A display device for holding sports memorabilia comprising:

a base;

a U-shaped arm assembly extending from the base and including first and second arms having spaced apart distal ends, said U-shaped arm assembly comprised of a resiliently flexible material; and first and second cups attached respectively to the distal ends of the first and the second arms such that the cups face one another, wherein the distal ends of the arms can be spread apart due to the flexibility of the arm assembly to receive sports memorabilia between the cups, and then the distal ends of the arms can be released so that the arm assembly will substantially return to its original U-shape due to the resilience of the arm assembly to hold the memorabilia between the cups in compression.

15. The display device of claim 14 wherein the base is adapted to be hung on a wall.

16. The display device of claim 14 wherein the arm assembly includes a third arm between the first and the second arms providing additional support for the memorabilia.

17. The display device of claim 14 wherein the arm assembly is rotatably secured to the base.

18. The display device of claim 14 wherein the cups comprise rigid cups.

19. The display device of claim 18 wherein the cups comprise flexible cups.

20. The display device of claim 18 wherein the arm assembly is comprised of a polymeric material.

* * * * *